Dec. 13, 1966 W. L. RUSSELL 3,292,143

METHOD AND APPARATUS FOR GEOPHYSICAL EXPLORATION UTILIZING VARIATION IN AMPLITUDE ATTENUATION OF DIFFERENT FREQUENCIES

Filed March 8, 1963 6 Sheets-Sheet 1

William L. Russell
INVENTOR.
BY Arnold and Roylance
ATTORNEYS

William L. Russell
INVENTOR.

BY Arnold and Roylance

ATTORNEYS

William L. Russell
INVENTOR.
BY Arnold and Roylance
ATTORNEYS

William L. Russell
INVENTOR.
BY Arnold and Roylance
ATTORNEYS

William L. Russell
INVENTOR.
BY Arnold and Roylance
ATTORNEYS

Dec. 13, 1966 W. L. RUSSELL 3,292,143

METHOD AND APPARATUS FOR GEOPHYSICAL EXPLORATION UTILIZING VARIATION IN AMPLITUDE ATTENUATION OF DIFFERENT FREQUENCIES

Filed March 8, 1963 6 Sheets-Sheet 6

William L. Russell
INVENTOR.

BY Arnold and Roylance

ATTORNEYS 3,292,143

METHOD AND APPARATUS FOR GEOPHYSICAL EXPLORATION UTILIZING VARIATION IN AMPLITUDE ATTENUATION OF DIFFERENT FREQUENCIES

William L. Russell, 400 Brookside Drive, Bryan, Tex.
Filed Mar. 8, 1963, Ser. No. 263,991
6 Claims. (Cl. 340—15.5)

The present invention relates to geophysical exploration and more particularly to method and apparatus for investigating the physical properties of rock formations.

A great deal of development has taken place in the field of geophysical methods and apparatus to provide more reliable and complete data on lithologic characteristics. The techniques may be classified into two main groups: surface exploration—seismology, and subsurface exploration—borehole surveying.

The seismic technique is illustrated in United States Patents 2,217,806 to G. Muffly, and 2,620,890 to B. D. Lee et al., wherein an explosion vibrates the earth at one location near the surface and the time for subsurface reflections or refractions to arrive at spaced points about the initiating location is measured. The equipment for measuring the time interval must be highly accurate and the seismic readings must be correlated with other data to predict the type of formation with reasonable accuracy.

The borehole surveying technique is accomplished by a number of methods and apparatuses. One method is the velocity log, wherein the velocity of acoustic energy through the subsurface portions adjacent the borehole is determined, as illustrated in United States Patent 2,931,455 to R. J. Loofbourrow. Again, this method depends on time measurements and requires an elaborate and highly reliable control system.

In another method of borehole surveying, a transmitter is positioned within a borehole to introduce acoustic waves into a rock formation and a receiver detects the acoustic waves emerging from the rock formation at another location in the borehole. Amplitude attenuation of the acoustic energy occurs as it passes through the intervening rock formation and the degree of attenuation is analyzed to identify subsurface characteristics. United States Patents 2,191,199 to Schlumberger, and 2,191,120 to L. B. Slichter are representative of this attenuation logging method.

One limitation encountered with the attenuation logging method is that the variation in acoustic energy amplitude reaching the receiver may be caused by several factors, making it difficult to identify the rock formation. The acoustic energy attenuation for some types of rock formations does not differ appreciably and measuring the attenuation with substantially single frequency acoustic energy does not adequately detect the different formations.

One of the chief problems encountered with the attenuation logging method is the control of the amount of acoustic energy coupled to the rock formation. Ideally, the same amount of acoustic energy should be coupled to the rock formation for each measurement. In practice, the amount of energy coupled to the formation can vary significantly. For example, the transmitter coupling to the rock formation at the borehole wall can be direct, or through a coupling medium. A poor contact at the borehole wall will decrease the acoustic energy reaching the rock formation. As another example, the type of rock formation at the points where the receiver and transmitter are located affects the degree of acoustic energy coupling. Also, reflections at boundaries between different types of rocks in the path of the acoustic energy cause a reduction in the acoustic energy that reaches the receiver.

Accordingly, it is an object of the present invention to provide a method and apparatus for improvement in surface and subsurface geophysical exploration.

It is another object of the present invention to increase the accuracy and reliability using the seismic and borehole surveying techniques.

It is still a further object of the present invention to provide improved geophysical exploration methods and apparatuses that utilize the analysis of the amplitude attenuation of acoustic energy transmitted into a rock formation to determine the lithology.

It is a further object of the present invention to provide methods and apparatuses for attenuation logging that are capable of precisely measuring the attenuation in rock formations.

It is another object of the present invention to compensate for the effect of variations in the amount of acoustic energy coupled to the rock formation surfaces in an attenuation logging system.

It is still a further object of the present invention to provide method and apparatus for determining the properties of rocks adjacent a cased borehole.

It is another object of the present invention to provide method and apparatus for determining the properties of rocks adjacent a gas or air drilled borehole.

In one form the method of the present invention may be briefly described as comprising the steps of producing mechanical vibrations of different frequencies. The amplitude ratio of the mechanical vibrations of the different frequencies is constant. The mechanical vibrations are coupled to the rock formation and received after passage through the rock formation. The received mechanical vibrations are then analyzed to compare the amplitudes of the different frequencies. The different frequencies can be selected to have different absorption rates in a rock formation.

Apparatus according to one embodiment of the present invention includes a slender housing adapted to be disposed in a borehole. Within the housing is means to produce acoustic energy having at least two frequencies of constant amplitude ratio that are attenuated to a substantially different extent in a particular type of rock. Associated with the housing is means for receiving acoustic energy in the borehole. The received acoustic energy is coupled to a means that produces an electrical output proportional to the acoustic energy amplitude ratio of the different frequencies, and the electrical output is coupled to a suitable indicator.

These and other objects of the present invention will become apparent from a reading of the following description, wherein the drawings consist of:

Figure 1:
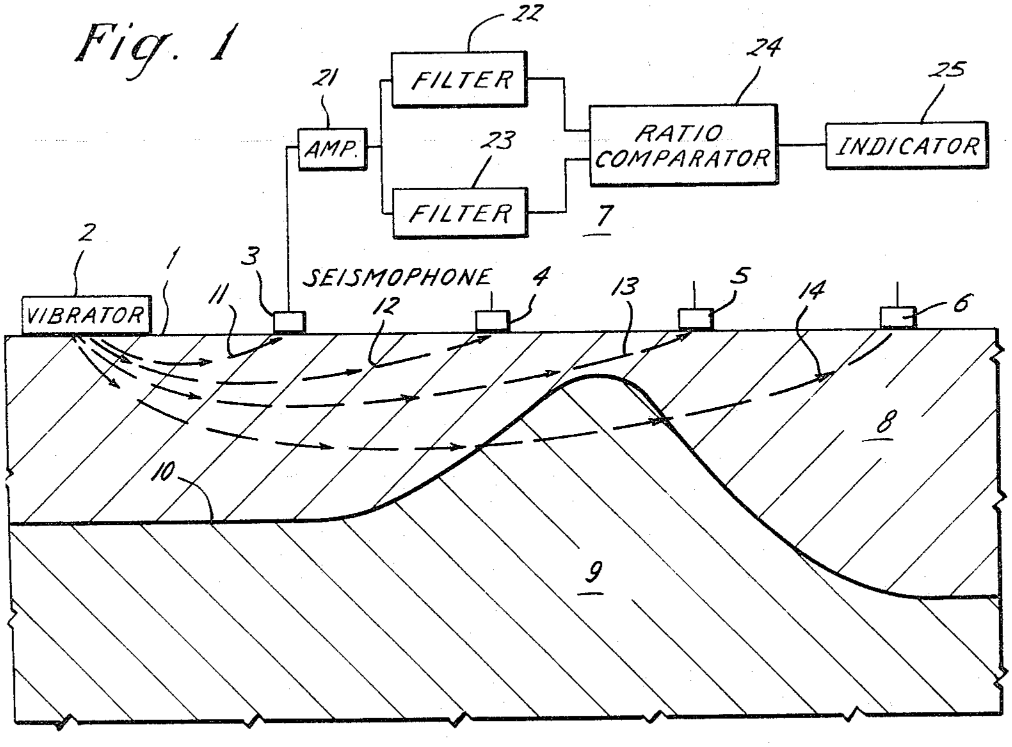
FIG. 1 is a schematic representation of one embodiment of the present invention as applied to the seismic exploration technique.

The attenuation of vibratory energy (also referred to interchangeably as acoustic energy or mechanical vibrations) along the path between a transmitter and receiver may be due to several, separate factors. In geophysical exploration it is important to isolate the change caused by variation in the properties of rocks along the path.

Rocks absorbs acoustic energy (attenuate the amplitude of vibration) and the rate of absorption may vary with frequency. For example, the attenuation produced by 3 inches of limestone at a frequency of 1600 kc.s. would be produced by about 15 inches of the same rock at a frequency of 500 kc.s. Other rocks may have only a small variation in attenuation with frequency. It can be seen that by using two frequencies having a constant amplitude ratio at the transmitter and a significant difference in absorption rate for particular rocks, that a comparison of the amplitude of the two frequencies will offer some data on the identity of the rock formation.

The attenuation of acoustic energy is also seriously affected by certain irregularities along the path between the transmitter and receiver. For example, the transmitter and receiver must be acoustically coupled to the rocks formation. Often the coupling medium has several boundary interfaces between material surfaces of different density. Reflections occur at the boundary interfaces. Also, as the transmitter and receiver are moved to different locations, a change in the type of contact alters the amount of acoustic energy that continues on the path to the receiver.

In accordance with the present invention, the effect of variations in acoustic energy amplitude due to the changes in the type of boundary contact and coupling medium, and the like, is reduced by transmitting acoustic energy having different frequencies with a constant amplitude ratio at the transmitter and comparing the amplitudes of the different frequencies reaching the receiver. The variation in attenuation due to changes in boundary contact and the like are cancelled out to a great extent, since each frequency is affected approximately to the same extent. Thus, the comparison of amplitudes of different acoustic frequencies is more responsive to changes in lithologic properties than the amplitude variation of a single frequency.

The different frequencies need not be only two frequencies. Two or more acoustic energy bands or groups of frequencies can be selected. One band can comprise essentially a number of closely spaced frequencies, and another band can comprise essentially a second group of closely related frequencies, different from said first group. Accordingly, when reference is made to different frequencies in the specification and claims, it is understood that the acoustic energy can be essentially two or more single frequencies or two different acoustic energy bands, or other combinations as follow the teaching of the present invention.

The amplitude comparison may take several forms. For example, the difference in or ratio of the amplitudes of the different frequencies can be observed, with manual plotting or appropriate electronic devices being used to perform the comparison and indicate the result. It will be assumed throughout this specification and claims that comparison means any technique to continuously compare the amplitudes and indicate a change in one of the amplitudes with respect to the other amplitude. The embodiment described herein uses a ratio comparison of the amplitudes merely by way of example.

The present invention may take several forms in its application to geophysical exploration. FIG. 1 illustrates a seismic refraction apparatus set up according to the present invention to survey the lithology below the earth surface 1. Disposed on the earth surface 1 are a vibrator 2, four seismophones 3, 4, 5 and 6, and a separate analyzer 7 for each seismophone (only the analyzer connected to seismophone 3 is shown). Below earth surface 1 are two rock formations, 8 and 9 having an interface 10 where rock formation 9 rises into the upper rock formation 8.

The vibrator 2 produces mechanical vibrations that are coupled to earth surface 1 and are transmitted to seismophones 3, 4, 5 and 6 over paths 11, 12, 13 and 14, respectively. The frequency of vibrator 2 can be controlled to transmit mechanical vibrations of two or more different frequenceis, either by sweeping a frequency range, transmitting each frequency separately or simultaneously, or by other suitable techniques. The amplitude of mechanical vibrations for each frequency is held substantially constant or at least the amplitude ratio of the frequencies to be analyzed is held constant. The vibrator 2 may be electrically or fluid actuated and controlled, or a mechanically controlled vibration system may be utilized in accordance with conventional techniques and equipment, to produce either a continuous or a short duration transmission of mechanical vibrations, depending on the technique to be employed.

Figure 2:
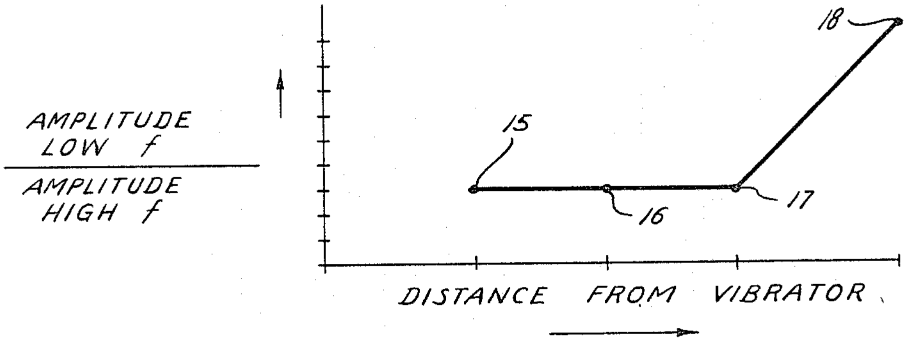
FIG. 2 is a graph showing the variation of the amplitude ratio for two frequencies of the acoustic energy received with the apparatus illustrated in FIG. 1.

The frequencies produced by vibrator 2 may be specially selected to identify a particular rock. For example, assuming formation 8 has a faster seismic velocity than formation 9, there is relatively little difference in the rates of absorption of the two frequencies in formation 8. On the other hand, in formation 9 there can be a marked difference in the relative rates of absorption of different frequencies, the amplitude of higher frequencies being relatively highly absorbed. Consequently, the mechanical vibrations sent along paths 11, 12 and 13 have essentially a constant and low amplitude ratio for the different frequencies. However, the mechanical vibrations traveling along path 14 to seismophone 6 pass through formation 9, and the amplitude ratio of the different frequencies is therefore altered. A plot of the ratios versus distance from the vibrator 1 is shown in FIG. 2, where points 15, 16, 17 and 18 correspond to the amplitude ratio for the different frequencies at seismophones 3, 4, 5 and 6, respectively.

The seismograph refraction survey first described has the advantage over the conventional seismograph refraction survey (where the arrival time of the first impulse is recorded) of being able to determine the nature of formation 9. The results of this type of survey gives further data on the variations in lithologic properties with depth. Such data is used in prospecting for oil and gas, in making surveys for engineering structures, and in prospecting for metallic ores. Also, the effect of variations in boundary contact for the seismophones is effectively eliminated by comparing the ratio of amplitudes of different frequencies at each seismophone.

The comparison of the amplitude of the different frequencies at each seismophone is accomplished by analyzer 7 located at the earth surface 1, or by other suitable apparatus. The mechanical vibrations of each frequency may be transmitted simultaneously or successively, or bands of frequencies can be transmitted successively, and each successive transmission can be separately recorded at the receiving location for subsequent comparison, as taught in United States Patent 2,620,890 to B. D. Lee et al.

The analyzer 7 has an amplifier 21 coupled to seismophone 3, to receive an electrical signal having the same frequencies and relative amplitudes as the received mechanical vibrations. The output of amplifier 21 is coupled to two filters 22 and 23, one tuned to a high frequency or band of frequencies and one tuned to a lower frequency or band of frequencies, excluding substantially all other frequencies from the output of the filters. A band-pass or other type of filter can be used to produce an electrical signal substantially proportional to the acoustic energy in a particular frequency range.

The outputs from filters 22 and 23 are coupled to separate inputs of a ratio comparator 24 (commonly called a divider) having an output that is proportional to the ratio of the amplitude of the two input signals. The comparator may include at each of its inputs a detector that produces a D.C. signal proportional to the amplitude of the frequency(ies) in the band passed by the responsive filters 22 and 23. The output from ratio comparator 24 is coupled to an indicator 25, such as a recorder or galvanometer. The ratio comparator 24 may take several forms. For further information on electronic devices that may be used, reference is made to "Massachusetts Institute of Technology, Radiation Laboratory Series," edited by Louis N. Ridenour, vol. 19, pages 668–679, and vol. 21, pages 48–63, especially pages 50–53. After the output from each seismophone is processed in the same manner, a graph of amplitude ratio for the two frequencies may be plotted as shown in FIG. 2.

The seismic refraction apparatus illustrated in FIG. 1 and described above, has the advantage of requiring only one set up and a relatively short time to secure data from various depths. The seismophones are spaced at different distances from the vibrator along a line and the depth of penetration of the received vibratory energy increases with increasing source-to-seismophone spacing. The output from each analyzer 7 can be recorded, on a tape recorder, for example, and the stored outputs can be processed in accordance wtih standard techniques to obtain some evidence on the identity of subsurface rock formations. An alternative technique would be to have a series of acoustic energy transmissions and move the seismophone to a new distance from the vibrator for each transmission to change the penetration of the received vibratory energy. The seismophone outputs can be recorded and processed.

Another method of employing the arrangement of FIG. 1 is to obtain data on the lithology to a certain depth from earth surface 1. The spacing between the vibrator 2 and a seismophone can be kept constant and both the vibrator 2 and seismophone moved along the earth surface 1 together to receive mechanical vibrations from essentially the same path depth.

Figure 3A:
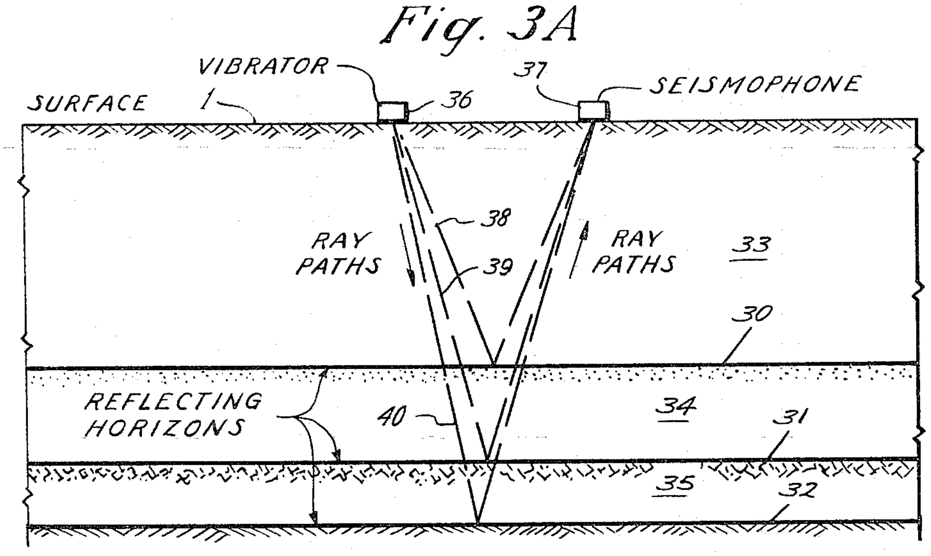
FIG. 3A is a schematic representation of one embodiment of the present invention as applied to reflection seismograph techniques, to determine lithologic characteristics.
Figure 3B:
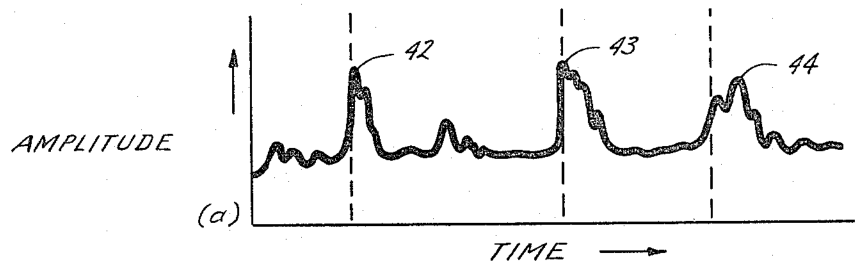
FIG. 3B is a graph of the receiver output for the arrangement illustrated in FIG. 3A, showing the total energy of a single frequency plotted against time.
Figure 3C:
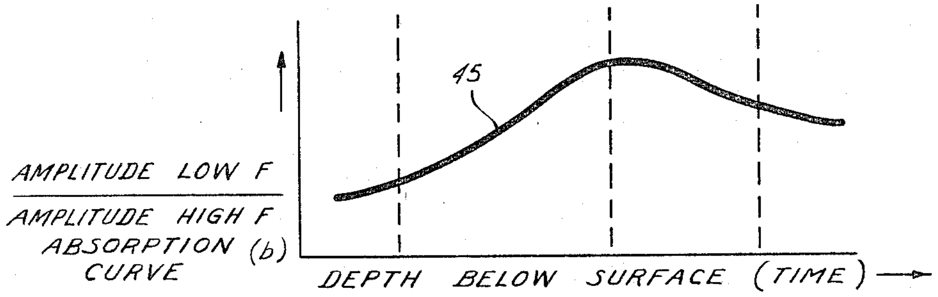
FIG. 3C is a graph of the receiver output of the arrangement illustrated in FIG. 3A, showing the ratio of amplitudes for two frequencies of the acoustic energy plotted against time.

The present invention may be used in conjunction with reflection seismograph techniques to determine the lithologic characteristics of the rocks between horizons or zones giving the reflections. FIGS. 3–A, B and C relate to such an application. In FIG. 3–A a cross-section is shown of a portion of the earth, having a surface 1, and reflecting interfaces 30, 31 and 32 between zones 33, 34 and 35, respectively. Disposed at the earth surface 1 are a vibrator 36, and a seismophone 37. The electronic signal processing system (not shown) is conventional, to indicate the time interval for the reflections from interfaces 30, 31 and 32 along paths 38, 39 and 40, respectively. An analyzer, such as the analyzer 7 described for the arrangement of FIG. 1, can be coupled directly to the seismophone 37 to provide data on the amplitude ratio of the different frequencies of the mechanical vibrations generated by vibrator 36.

Vibrator 36 can be the same as the vibrator 2 described for the system of FIG. 1. For example, only the vibrator 36 can produce mechanical vibrations of two different frequencies having a constant amplitude ratio. These frequencies are so chosen that there is a measurable difference in their rates of absorption, with the higher frequency able to return to the seismophone 37 with sufficient intensity to be accurately measured. The mechancal vibrations are emitted in a series of bursts of short duration, comprising the selected two frequencies. The seismophone 37 receives the reflected mechanical vibrations.

FIG. 3–B illustrates the total energy of a single frequency plotted against time, obtained from conventional reflection seismograph apparatus. The peaks 42, 43 and 44 are due to energy reflected from certain good reflecting horizons or zones 30, 31 and 32, respectively, of FIG. 3–A. The addition of an analyzer, such as analyzer 7 described in connection with the arrangement of FIG. 1, will process the output of seismophone 37 to permit a plot of the amplitude ratio of the two selected frequencies against time, as shown by curve 45 in FIG. 3–C. Up to the time the reflection identified by peak 42 in FIG. 3–B reaches seismograph 37, the position of the curve 45 is determined by the average of the ratios of absorption of the formations above reflecting horizon 30. Whether the curve rises, falls or remains in the same position after reflection from horizon 30 has passed, depends on the ratios of absorption of the two frequencies in the stratigraphic interval between reflecting horizons 30 and 31, and 31 and 32. The curve 45 rises in the interval between horizons 30 and 31, showing that the higher frequencies are relatively more absorbed in this interval. This change could be due to a porous rock or a shale. Between reflecting horizons 31 and 32 the curve is shown with a downward trend, which could indicate a hard, nonporous rock, free from shale.

The present invention may also be incorporated in the borehole surveying technique to identify the rock formation adjacent the borehole. Suitable apparatus may take many forms and FIG. 4 is merely illustrative of one type of apparatus.

Figures 4, 5:
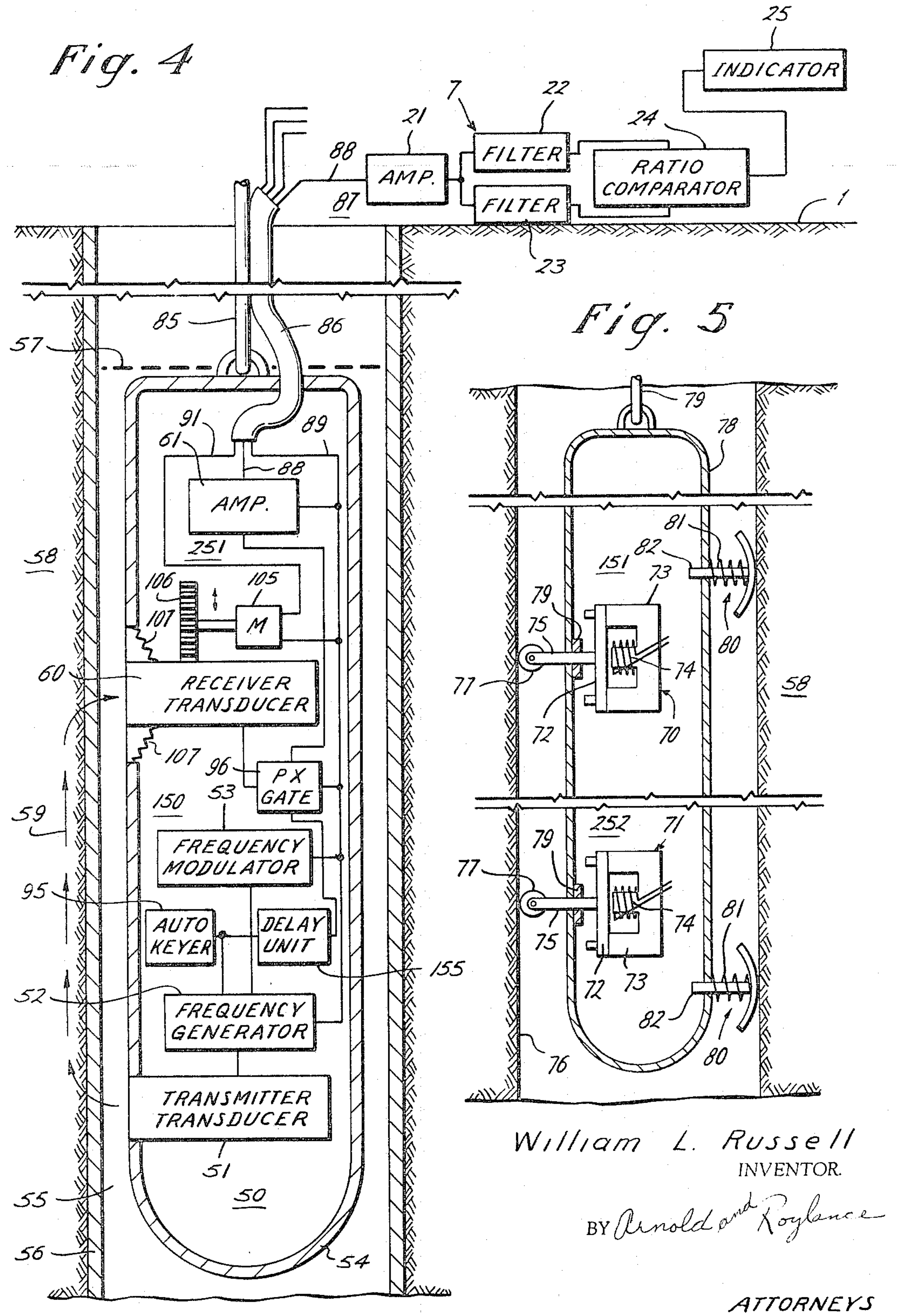
FIG. 4 is one embodiment of a survey tool arranged for use in a cased borehole in accordance with the present invention.
FIG. 5 is another embodiment of a survey tool arranged according to the present invention for use in air or gas drilled boreholes.

The apparatus shown in FIG. 4 comprises a survey tool 50, a hoist cable 85, control cable 86 and surface equipment 87.

In general, the survey tool 50 comprises transmitter means 150 for establishing acoustic vibrations in borehole 57. In the illustrated apparatus, the transmitter means 150 comprises the combination of transmitter transducer 51, frequency generator 52, and frequency modulator 53, located within closed housing 54 disposed in borehole 57. A mud fluid 55 surrounds the housing 54 and couples the acoustic energy from transducer 51 through housing 54 to the rock formation 58 adjacent borehole 57.

Many types of transducers may be used to generate the acoustic energy, such as electromagnetically operated diaphragms, crystals electrically or magnetically controlled as is conventional in the art of sound transmitters. The transducer should have a frequency band width to respond to the range of frequencies selected with a substantially uniform amplitude output.

The acoustic energy from transducer 51 passes along path 59 in rock formation 58 to a means 251 for receiving the acoustic energy after passage through a portion of the rocks 58. The receiving means 251 comprises a receiver transducer 60 coupled to the mud fluid 55 and an amplifier 61 for amplifying the electrical signal produced by receiver transducer 60. Transducer 60 can take several forms, such as electromagnetically responsive devices, as in conventional in the art. The transducer should have a frequency band width to faithfully reproduce the amplitude of the range of frequencies selected.

As mentioned previously, the transmitter means 150 and the receiving means 251 may be coupled to the rocks 58 by means of the mud fluid 55. Alternatively, the transmitter means and receiving means may be arranged for direct mechanical contact with the rock formation, as is required in air or gas drill boreholes. FIG. 5 illustrates one of several forms of a direct contact transmitter means 151. Transmitter means 151 comprises transducers 70 and the receiving means comprises transducer 71, both substantially identical and conventional in form and operation, disposed in housing 78. Each of transducers 70 and 71 includes an electromagnetic responsive diaphragm 72 and a magnetic core 73 having a coil 74 wrapped thereon. The diaphragm 72 has a rigid mechanical member 75 connected to move with the diaphragm and extends into contact with the borehole wall 76, with a wheel rotatably mounted at the contacting end. The member 75 is free to move outwardly of housing 78 through a guide passage 79 in the housing wall, but is prevented from moving in other directions. The housing 78 is suspended in position by a hoist cable 79 and is spaced from the borehole wall 76 by several spring load sled feet 80 (only two sled feet 80 are shown in FIG. 5, but several others can be disposed about housing 78). Sled feet 80 are biased outward from housing 78 by spring 81 surrounding leg 82 that slides in housing 78. Sled feet 80 move toward housing 78 against the pressure of spring 81.

The operation of a survey tool having direct mechanical coupling to the rock formation, as illustrated in FIG. 5, is essentially the same as for the survey tool 50 shown in FIG. 4. The vibratory energy is generated by transducer 70 and coupled to rock formation 58 by member 75 and picked up by the transducer 71 through the coupling provided by the corresponding member 75. The variation in the magnetic circuit comprising diaphragm 72, coil 74 and magnetic core 73 may be sensed in a number of ways, as by an impedance or voltage measuring device, to convert the mechanical vibrations into an electrical signal corresponding to the frequencies and amplitudes transmitted through the rock formation 58.

The survey tool 50 shown in FIG. 4 is electrically interconnected with surface equipment 87 by line 88 of control cable 86. Alternatively, the hoist cable can contain conductors to provide electrical power and connections to survey tool 50. The surface equipment 87 includes analyzer 7, the same as the analyzer described in connection with the arrangement of FIG. 1, to process the output from amplifier 61 that is coupled to the receiver transducer 60 through a gate 96 (to be described later). Power is supplied to the devices within the housing 54 by line 89, and line 91 is for a special control purpose to be described further on.

In one embodiment, the frequency generator 52 can operate continuously to drive the transmitter transducer 51 with a constant amplitude, constant frequency signal. The modulator 53 varies the frequency of the generator 53 to provide the desired selected frequencies at a constant amplitude ratio. The modulator 53 may cause the frequency of generator 52 to sweep, or jump between selected frequencies, or any other suitable approach may be used, so that in effect a simultaneous transmission of the different frequencies occurs. Alternatively, two separate sets of generators of different frequencies and transmitter transducers may be used to provide the selected frequencies at a constant amplitude ratio, operating continuously or for short durations.

In a cased borehole, it is preferable to transmit the acoustic vibrations for only a short duration and to eliminate response to acoustic energy traveling down the casing 56 or through the mud fluid 55. Suitable apparatus is described in United States patents 2,931,455 to R. J. Loofbourrow and 2,691,422 to Summers, for example.

The apparatus shown in FIG. 4 is arranged for use in cased boreholes. The frequency generator 52 is turned on for a short time and then off by an automatic keyer 95, such as by a periodic switch in the power circuit. Automatic keyer 95 produces a control signal that opens gate 96 for a selected period, after a time delay introduced by delay unit 155, to pass a signal from receiver transducer 60 only during a portion of the period after transmitter means 150 operates. Receiver transducer 60 picks up substantially only the energy reaching the receiver transducer from the rock formation 58. The indicator 25 can have a large time constant, in the form of a signal integrating means, for example, to indicate the amplitude ratio without fluctuation due to the pulse transmission of the acoustic energy.

Figure 6:
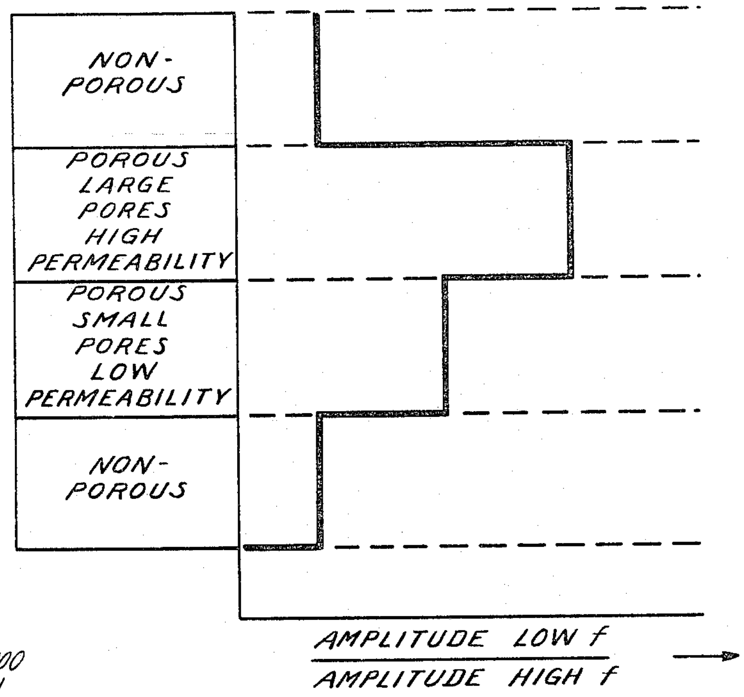
FIG. 6 is an illustration of data obtained in surveying a borehole with the method and apparatus of the present invention.

With a fixed spacing between transmitter transducer 51 and receiver transducer 60, the survey tool 50 can be used to obtain important lithologic data. FIG. 6 illustrates a possible arrangement of lithologic properties along the length of a borehole in the lefthand column and the amplitude ratio log that may be obtained with the surface equipment 87 is shown to the right. The amplitude ratio is low opposite non-porous rocks because of the low absorption of both selected frequencies. Opposite porous rock this amplitude ratio is high because of the greater absorption of the higher frequency. If the wave length of the higher frequency approaches in magnitude the diameters of the pores of the porous rock, these higher frequencies will be scattered, and the amplitude of the higher frequencies reaching the receiver transducer will be greatly reduced. Since these coarser pores occur in the more permeable portions of porous zones, this method affords a means of logging permeability.

In FIG. 6 the non-porous portion of the rock formation is shown far to the left on the amplitude ratio log. The porous zone which is relatively impervious is shown well to the right. The highly permeable portion of the porous zone is shown far to the right, assuming the wave length of the higher frequency approaches the diameter of the pores.

It is apparent that as the present invention is used to log a cased borehole, the location of the casing points can be recorded on the log to establish permanent depth markers.

The basic concept of the present invention can also be employed in a two receiver logging tool, similar to the logging tool commonly used in taking velocity logs in a borehole. The use of one transmitter positioned at a fixed distance from space receivers, substantially eliminates errors due to conditions and substances in the borehole between the walls of the bore and the walls of the logging tool. The acoustic energy at each receiver is analyzed to compare the amplitude of the different frequencies and the discrete quantity resulting from the analysis comparison from each receiver is compared to produce a primary discrete quantity indicative of the nature of the rock formation.

Figure 10:
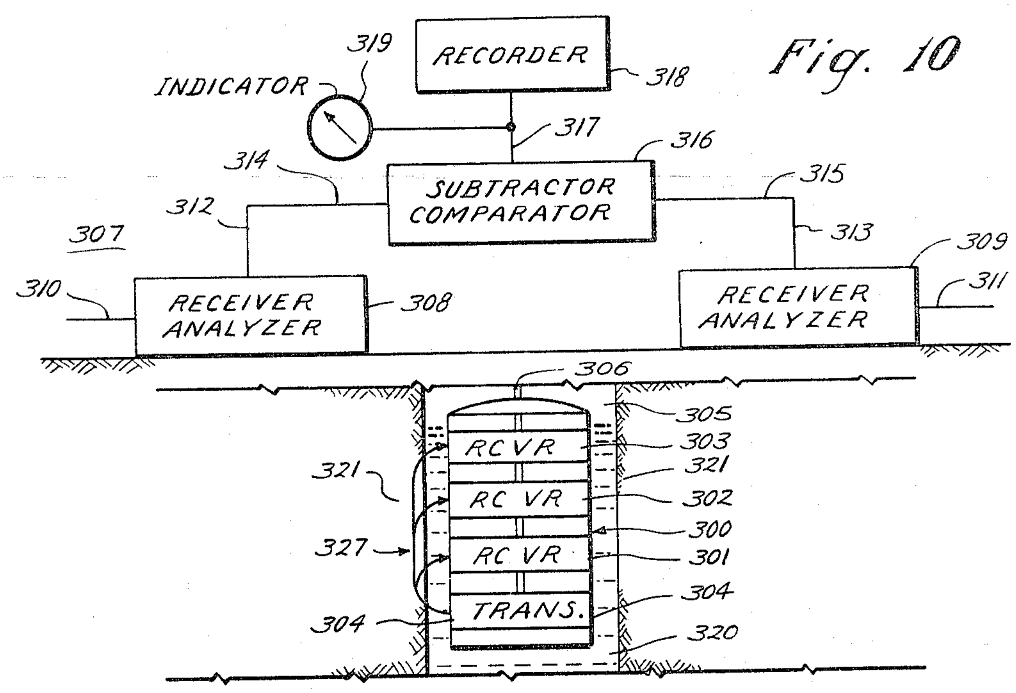
FIG. 10 is a simplified schematic representation of another embodiment of the present invention for substantially eliminating the effect of borehole conditions on the attenuation measurement.

One embodiment of apparatus for carrying out the method just stated, is shown in schematic form in FIG. 10. A number of the detailed features of the apparatus have already been described and will not be repeated. The apparatus includes a logging tool 300 suspended from cable 306 in borehole 305 and connected via cable 306 to surface equipment 307. The borehole 305 is filled with fluid 320. The rock 321 lies adjacent the borehole 305. The logging tool 300 can be used in cased and uncased boreholes with appropriate modification as covered in the description of the apparatus in FIG. 4.

A logging tool arranged in accordance with the present invention can include two or more receivers. In the disclosed embodiment of FIG. 10, tool 300 has three receivers 301, 302 and 303, in the form of transducers, as described in connection with the apparatus of FIG. 4, and a transmitter 304 in the form of a transducer, suitably connected to a source of electrical energy having different frequencies, as described in connection with the apparatus of FIG. 4. Receivers 301, 302 and 303 and transmitter 304 are fixed in position within logging tool 300. The acoustic energy from transmitter 304 passes through the rock formation 321 along paths 327 to the receivers 301, 302 and 303.

The equipment 307, which can be located at the surface or in the logging tool 300, processes the electrical signal from the receivers 301, 302 and 303 and includes analyzers 308 and 309, each having an input 310 and 311, respectively, connected to the outputs of different receivers, to obtain an electrical signal corresponding to the received acoustic energy. Analyzers 308 and 309 can be the same as analyzers 7 described in connection with the apparatus of FIG. 4, the inputs 310 and 311 being the inputs to the amplifier 21. Each of analyzers 309 and 310 has an output 312 and 313, respectively, corresponding to the output of the ratio comparator 24 (FIG. 4), that is coupled to separate inputs 314 and 315 of a subtractor comparator 316. Subtractor comparator 316 is a standard design that produces a signal at output 317 proportional to the difference between the input signals, and the output signal is coupled to indicators, such as recorder 318 and meter 319. It is apparent that a ratio comparator such as 24 (FIG. 4) could be used. Equipment 307 may include additional analyzers and subtractors connected in the manner of the disclosed embodiment to process signals from additional receivers spaced along the length of and within the logging tool 300, so that separate sets of data can be obtained at the same time.

Figures 11, 12:
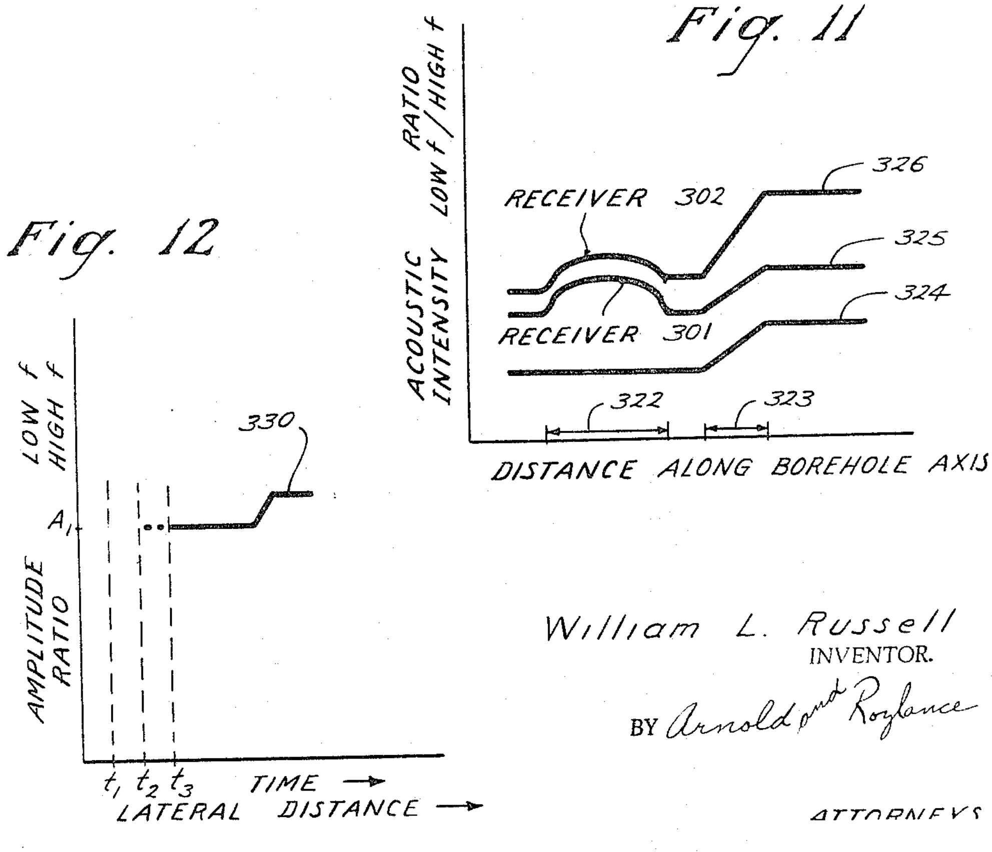
FIG. 11 is a graph used in the explanation of the embodiment of FIG. 10, illustrating acoustic intensity ratio variation with distance at each receiver and a comparison of the intensity ratios from the receivers.
FIG. 12 is a graph, illustrating one possible variation of received acoustic energy ratio produced by transmitting a single pulse of acoustic energy into a rock formation for identifying the nature of the rock formation and fluids adjacent a borehole wall.

FIG. 11 illustrates one possible relationship of acoustic intensity at receivers 301 (curve 325) and 302 (curve 326) as the logging tool 300 is moved down the borehole 305. Changes are noted in the output of each receiver in regions 322 and 323. Without further processing it is not readily apparent what caused the changes in regions 322 and 323. By using the method as outlined above, where, in this example, the acoustic intensities at the different frequencies are compared by subtracting the ratios at one transmitter-receiver spacing from those at another transmitter-receiver spacing, the effects of the borehole conditions and fluids are substantially eliminated. Curve 324 represents the output of the subtractor comparator 316, and clearly shows that the change in region 322 was not due to the rock formation. In region 323 the curve 324 indicates a definite change in the nature of the rock formation.

The method described with reference to the apparatus of FIG. 10 can be employed equally as well in a cased borehole. The techniques and apparatus in the description of the apparatus of FIG. 4 can be used to transmit bursts or pulses of acoustic energy and the receivers can be gated on and off to receive only the acoustic wave traveling through rock formation 321.

The present invention may be used to determine the nature of fluids in porous rock immediately adjacent a borehole. In general, the method comprises transmitting acoustic energy into the adjacent borehole wall and receiving the acoustic energy returning from various lateral depths in the rocks. Such a method is especially useful when it is recognized that fresh water from the mud fluid displaces the original rock fluids to a distance of approximately ½ to 3 feet. The present invention will provide data on the nature of original rock fluids even under these circumstances.

Figure 7A:
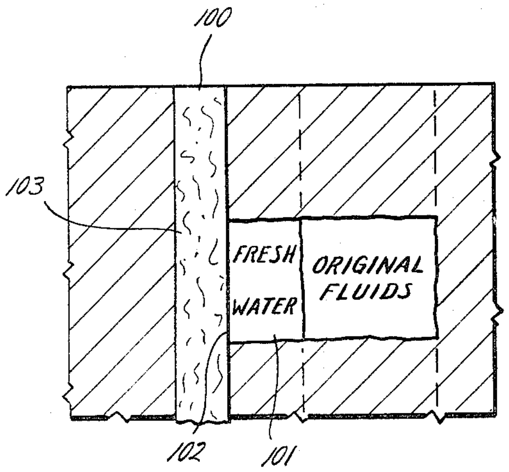
FIG. 7A is an illustration of a subsurface formation immediately adjacent a borehole wall.
Figure 7B:
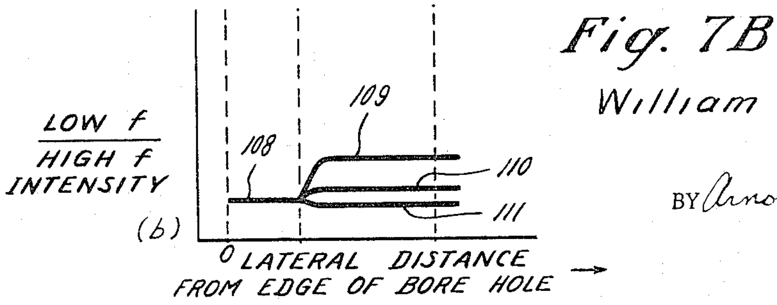
FIG. 7B is a graph showing the variation of amplitude ratio of two frequencies of acoustic energy at various lateral distances from the borehole wall illustrated in FIG. 7A.

As illustrated in FIG. 7–A, the borehole 100 may contain fresh water 101 adjacent the borehole wall 102 due to filtration from the mud fluid 103. Experience dictates that there will be a difference in the absorption rate depending on the type of fluid in the rock. Accordingly, one possible result is that the higher frequency acoustic energy will be absorbed to a greater extent than the low frequency acoustic energy in rock containing gas than in rock containing oil, and more in fresh water than in salt water. No matter what the relative order of absorption is for the various types of fluids, it is apparent that the present invention can be utilized to detect even a small change in absorption rate. The results can be compared with laboratory or field tests to complete the identification of the fluid.

By varying the lateral depth of penetration of the acoustic energy into the rock, separate data may be provided on the nature of the fluids within the rock at various distances from the borehole wall 102.

The investigation of the acoustic attenuation at various lateral distances can be accomplished in several ways according to the present invention. For example, the distance between the receiver and transmitter can be varied to change the depth to which the received acoustic is reaching, or the distance between the receiver and transmitter can remain constant and the frequency of the acoustic energy can be changed to vary the lateral penetration distance of the acoustic energy. Another method is to transmit multi-frequency acoustic energy and selectively evaluate the amplitude variation at several frequencies to note any change that might be some evidence of the nature of the original fluids.

The survey tool 50 shown in FIG. 4 is designed to provide data on the lithology at various lateral depths from a borehole wall. The output end of receiver transducer 60 is located in a large hole in the side of housing 54 and a flexible curtain 107 completely surrounds and attaches to the sides of receiver transducer 60 to permit movement of receiver transducer 60 axially along the borehole 57 while retaining a fluid seal for housing 54. The movement of receiver transducer 60 is affected by a servomotor 105 coupled through a rack and pinion assembly 106 to the receiver transducer 60. The movement is controlled by conventional electrical apparatus located at the surface (not shown), such as another servomotor, possibly requiring one or more control lines in addition to control line 91. Instead of moving the receiver transducer 60, it is apparent that the transmitting transducer 51 would be similarly mounted for movement.

In operating survey tool 50 for investigation of the lithology at various lateral depths from the borehole wall, the spacing of transmitter transducer 51 and receiver transducer 60 is held constant and a reading is taken to obtain the amplitude ratio. Then the spacing is changed and another reading is taken, corresponding to a different lateral depth of penetration. Curves similar to the ones shown in FIG. 7–B may be plotted with the resultant data, depending on the type of original fluid. Curve 109 may indicate the presence of gas, curve 110 may indicate the presence of oil, and curve 111 may indicate the presence of salt water. The common portion 108 of the curves may indicate the intervening fresh water 101.

The logging operation time can be reduced by utilizing a tool that mounts several receivers spaced longitudinally along the borehole from a transmitter, such as in tool 300 in FIG. 10. The tool 300 can be placed in the borehole and transmit acoustic energy into the borehole wall that is simultaneously received at each receiver from the formation. Since each receiver is at a different spacing from the transmitter 304, each receiver output will be representative of a different penetration depth and can be recorded for processing. The tool 300 can be moved steadily in the borehole as the receivers are operating and the receiver outputs can be individually recorded for future combination in such fashion that the data on acoustic attenuation at various depths is available for analysis.

The multi-receiver logging tool just described can be used equally as well with the previously mentioned technique for comparison of the attenuation of different frequencies transmitted through a formation. The transmitter can introduce into the borehole wall the acoustic energy of different frequencies. Each receiver output is coupled to apparatus (such as analyzer 7 shown in FIG. 1) that compares the attenuation of the different frequencies, and the results of the comparison are recorded. Subsequently, the recorded signals can be arranged in a form to show the relative attenuation at various lateral depths from the borehole. The tool can be moved as the transmitter and receivers are operating.

As an alternative, the lateral borehole survey may comprise transmitting acoustic energy for short durations at selected frequencies and at constant amplitude into the borehole wall and the separate reception of each frequency at a fixed location. The amplitude ratio of the received acoustic energy frequencies is analyzed on a time base to locate the portion of the received acoustic energy coming from the greatest recognizable lateral depth of penetration.

As mentioned above, another method for investigating the nature of original fluids beyond the invaded zone is to alter the frequency of the acoustic energy. The acoustic energy travels at right angles to the wave front. Thus, the line produced by a point on the wave front and moving with it is the ray, or course traveled by the acoustic energy. The ray is not a point in width, but a zone of appreciable but variable width. The width of the ray increases with the wavelength (decreases with frequency). In other words, waves of very short wavelength would travel in a ray path which would be very narrow and probably very close to the wall of the borehole, but within the rock. As the average wavelength of the acoustic energy increases, the width of the zone covered by the ray would increase, and, if one of the waves is wide enough, the ray would be partly in the zone of original fluids lying beyond the invaded zone. By noting the nature of the variations in the alternation as the uninvaded zone included in the ray path is penetrated by the rays (or is no longer penetrated by the rays, depending on whether the wavelength is initially high and decreased or initially low and increased), the nature of the original fluids in the uninvaded zone may be determined.

The above described method can be performed by several apparatuses, such as the apparatus shown in FIG. 4 (with only a few changes). The receiver-transducer 60 would remain fixed in position in reference to transmitter-transducer 51. The transmitting means 150 would be arranged to have the frequency modulator programmed to gradually change the average frequency of frequency generator 52 over a time period to increase the wavelength. A single frequency acoustic energy can be used, recognizing the possible errors due to borehole condition, coupling, etc. As the acoustic energy average frequency is varied, the band-pass of a filter interposed between an amplifier and indicator can be correspondingly varied, to permit analysis of the amplitude variation of the transmitted acoustic energy. Suitable surface equipment for single frequency operation would include a filter, adjustable as described above, coupled to a detector and an indicator responsive to the detector output.

Apparatus with two receivers, such as shown in FIG. 10 can be employed, with the modifications as mentioned above, to determine the nature of the rock formation and fluids adjacent the borehole wall using the varying frequency method as described in the next preceding paragraphs.

Figure 8:
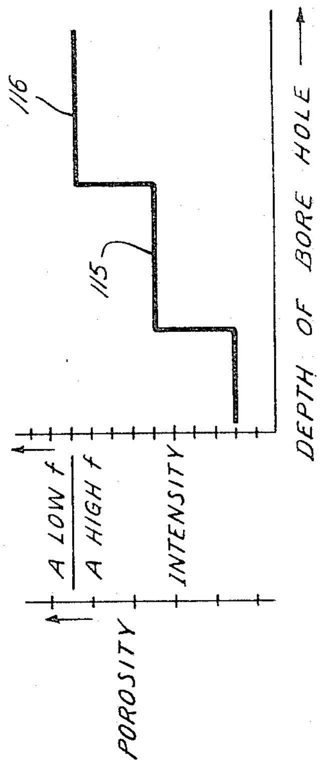
FIG. 8 is a graph showing the amplitude ratio for two frequencies of acoustic energy and porosity plotted against depth in a borehole.

The survey tool 50 may also be used for determining with fair approximation the porosity of a given type of rock formation, i.e., the ratio of the volume of interstices of the material to the volume of its mass. For example, FIG. 8 illustrates the variation of amplitude ratio as the survey tool 50 passes an adjacent reservoir (receiver transducer 60 being fixed in position). An increase in porosity is noted at 115 and 116.

Figure 9:
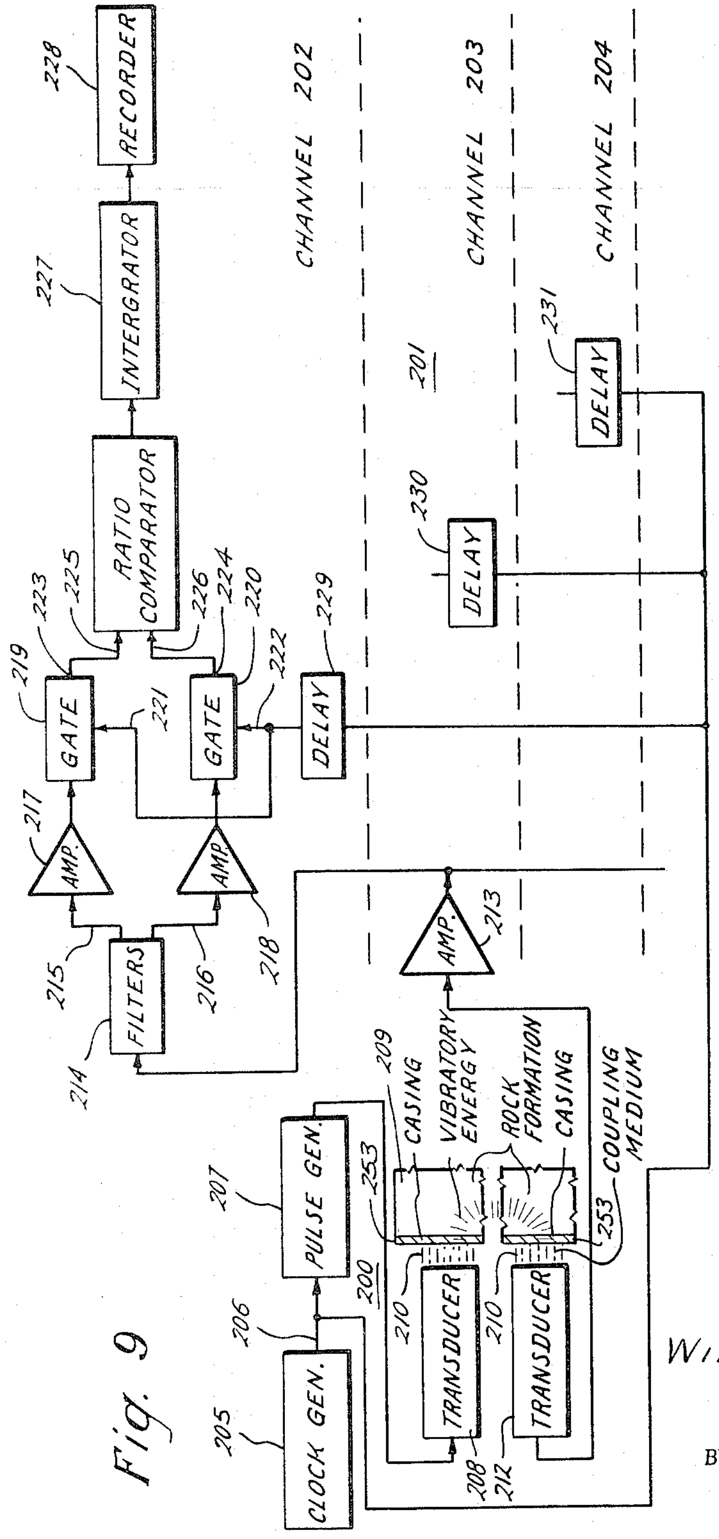
FIG. 9 is a schematic representation of another embodiment of the present invention for measuring the received acoustic energy amplitude ratio of different frequencies at selected time intervals after the initiation of the acoustic energy.

Another important general method of use for the basic concept hereinbefore related is the measurement of the amplitude ratio of different frequencies at selected time intervals after introduction of the vibratory energy, to obtain data on the rock formation at specific depths and locations. This method can be employed in surface seismic work and in logging formations in cased and uncased wells. The mechanical vibrations are introduced into the rock formation at one location and received at another location. The position of either the receiving or introducing locations can be varied with the other location held constant. At least one measurement of amplitude ratio is taken at a selected time interval after introduction of the mechanical vibrations for each separation distance. Alternatively, the receiving and introducing locations can be moved to successive positions on the rock formation, with a constant spacing between the receiving and introducing locations. The amplitude ratio is measured at each receiving location for at least one selected time interval after transmission of the mechanical vibrations at each introducing location. FIG. 9 illustrates one of several embodiments of apparatus for carrying out the specific methods, the example being with reference to a well having a casing 253 and a coupling medium 209.

The apparatus shown in FIG. 9 generally comprises a transmitting means 200, and receiving means 201 having three receiving channels 202, 203 and 204. Only receiving channel 202 is shown with its entire apparatus, to simplify the presentation, since receiving channels 202, 203 and 204 are identical except for one aspect to be explained later.

The transmitting means 200 includes a clock generator 205 that produces a series of pulses at regular time spacing at output 206. The clock generator output 206 drives a pulse generator 207 that provides a sufficient energy pulse to energize a transmitting transducer 208. Transmitting transducer 208 produces vibratory energy that is coupled to rock formation 209 (illustrated in fragmentary form) through coupling medium 210, or by mechanical means if the hole is air or gas drilled. The pulse generator output 206 causes transmitting transducer 208 to emit a group of acoustic waves of two or more predetermined frequencies having different rates of absorbing in a particular rock and a constant amplitude ratio at the introducing location. Alternatively, two separate combinations of frequency generators and transducers can be used to provide repetitive short duration transmissions of different frequencies simultaneously into the rock formation 209.

The vibratory energy from transmitting transducer 208 passes through the rock formation 209 and emerges out, either due to direct passage, reflection, refraction, or the like, and is received by receiving transducer 212 coupled to the rock formation 209, either directly or by coupling medium 210.

The coupling medium 210 can be the drilling fluid (mud). The receiving transducer 212 converts the vibratory energy to an electrical signal having the same frequencies and relative amplitudes. The output from receiving transducer 212 is amplified by amplifier 213 and coupled to the inputs of each of receiving channels 202, 203 and 204.

Receiving channel 202, for example, includes a filter means 214 that functions to produce a signal at each of the outputs 215 and 216 that is proportional to the amplitude of a particular frequency or band of frequencies in the signal from amplifier 213. The filter means 214 can be tuned so that one output responds only to one of the predetermined frequencies and the other output responds to the other predetermined frequency. If the predetermined frequencies introduced by transmitter transducer 208 consist of a number of frequencies, the filter means 214 can be tuned to respond to a band of higher frequencies for one output and to a band of lower frequencies for the other output.

The filter means outputs 215 and 216 are coupled to separate gates 219 and 220, respectively, through amplifiers 217 and 218, respectively. Each of gates 219 and 220 has a control input 221 and 222, respectively, and an output 223 and 224, respectively, coupled to separate inputs 225 and 226 of a ratio comparator 24, as described previously. The output of ratio comparator 24 is coupled to an integrator 227 which is in turn coupled to a suitable indicator, such as recorder 228.

The synchronized control for the transmitting means 200 and receiving means 201 is provided by clock generator 205. The vibratory energy is transmitted in bursts or pulses and during the interval between pulses the receiving means 201 records the amplitude ratio of the predetermined frequencies at selected time intervals.

The clock generator output 206 is also coupled through a time delay unit 229 to the gate control inputs 221 and 222, to control when receiving channel 202 operates and the duration of operation after the vibratory energy is introduced into rock formation 209 (either wire or radio transmission of the control pulses from the transmitting means 200 to the receiving means 201 can be used). For example, if the apparatus is used in cased boreholes the receiving channel 202 can be made to operate (open gates 219 and 220) only after the vibratory energy traveling along the casing passes the receiving transducer 212 and closes the gates 219 and 220 before the next pulse is transmitted and before the vibratory wave traveling down the coupling fluid arrives at the receiving transducer 212. The time interval that receiving channel 202 operates can be a very short duration in between the transmitted pulses. The output signal from ratio comparator 24, proportional to the amplitude ratio during the selected interval, is coupled to integrator 227 after each pulse transmission and the integrator 227, having a sufficient time constant, averages the amplitude ratio for the corresponding time intervals and records the value on recorder 228 as a smooth curve.

Receiving channels 203 and 204 can be set to operate during different time intervals from each other and from receiving channel 202 during the time between transmitted pulses, by employing time delay units 230 and 231, respectively, having increasingly longer time delays. Each of time delay units 230 and 231 receives the clock generator output 206 and controls gates in the respective receiving channels to connect the ratio comparator inputs 225 and 226 for signal reception during a time interval shorter than the time spacing between transmitted pulses and for a duration producing either overlapping or completely separate time intervals within the time between the transmitted pulses.

The nature of the fluids beyond the invaded zone may be determined by still another method. The acoustic energy is transmitted into the borehole wall in a burst. The receiver means, disposed at another location in the borehole, spaced longitudinally thereof, receives the acoustic energy returning to the borehole wall. The returning acoustic energy is in the form of pulses of diminishing intensity. The first pulse received from the rock formation after the wave traveling down the casing, if a cased borehole is surveyed, has a significantly greater amplitude than the following received pulses. It is this first pulse that is used in velocity logging. The present invention, however, utilizes received pulses following the first pulse to identify the nature of the rock formation and fluids adjacent the borehole wall.

The receiver means is specially designed to have enough sensitivity to pick up the pulses following the first pulse from the rock formation. For this reason, it is desirable to condition the receiver to respond only to these following pulses, preventing overloading which would occur if the first pulse from the rock formation reached the amplifier. The receiver means is conditioned to be inactive during the time the wave traveling down the casing passes, if a cased borehole is surveyed, and when the first acoustic energy pulse is received from the rock formation and activated for processing certain following pulses. In this manner, high amplification is available for detecting the following pulses in a precise time interval.

The transmitting means can produce acoustic energy of different frequencies that is transmitted in bursts and compared by the receiving means. The variation in amplitude comparison for the different frequencies of the received pulses is indicated in relation to time, for example on a recorder.

Apparatus for carrying out the analysis of received pulses following the first pulse from the rock formation can take several forms. For example, the apparatus described with reference to FIG. 4 is suitable, when arranged for pulse operation of the transmitting means 150. The receiving means 251 can be arranged with amplifier 61 having a high amplification to pick-up weak pulses following the first, larger amplitude received pulse from the rock formation. After each transmitted pulse, the gate 96, coupling receiver transducer 60 to amplifier 61, does not open until a selected time after the first pulse or a following pulse from the rock formation is received from the formation. The delay unit 155 can be adjusted to select the particular pulses that are analyzed by varying the time delay and pulse lengthening of the control pulse from automatic keyer 95, thereby controlling the opening and closing time of receiver gate 96.

The apparatus shown in FIG. 9 may also be employed to perform the method of analyzing the amplitude variation of received pulses following the first received pulse from the rock formation. The delay units 229, 230, 231, etc., can be adjusted to activate their respective channels at selected times following the reception of the first received pulse, corresponding to intervals when pulses will likely be received.

The graph of FIG. 12 has a curve 330 indicative of one possible relationship of amplitude ratio and lateral distance from the borehole obtained with apparatus such as shown in FIG. 9. The transmitter produces a pulse at time $t_1$ and the first pulse from the formation arrives at the receiver at time $t_2$. If the first pulse had been analyzed, the amplitude ratio would have been at the level $A_1$ (indicated by the dotted line). At time $t_3$ the first channel actuates and the amplitude ratio is at level $A_1$, derived from a pulse following the first pulse from the formation. At later times the other channels activate and the amplitude ratio shows a definite increase, indicating a change in fluids in the rock formation and assisting in the identification of the original fluids.

The above description illustrates several complete, operative apparatuses for performing the methods of the invention. Other arrangements consistent with the teaching of this specification are within the scope of the invention. The appended claims define the scope of the patentable invention.

What is claimed is:

1. A method of exploration for data on the character of a geophysical formation adjacent the wall of a borehole, comprising the steps of introducing acoustic energy at selected three or more different frequencies into the borehole wall at a first location, said frequencies having a fixed amplitude relationship between them, said acoustic energy passing through the formation and back to the borehole;

receiving the returning acoustic energy at a second location fixedly spaced along the borehole wall from said first location;

detecting the amplitude relationship of a first combination of said selected frequencies;

detecting the amplitude relationship of a second combination of said selected frequencies, the frequencies of said second combination having longer wavelengths than the frequencies in said first combination, the frequencies in said second combination being affected by a deeper lateral penetration of the formation than the frequencies in said first combination.

2. A method of borehole exploration for data on the character of formation adjacent the borehole, comprising the steps of transmitting acoustic energy into said formation at one location in the borehole;

said acoustic energy comprised of groups of at least two different frequencies, the ratio of the amplitudes of which are held constant when introduced into said formation;

receiving said acoustic energies after passage through and out of said formation in said borehole at a receiving location spaced from said transmitting location, energy at each frequency being absorbed in said formation to a substantially different extent from energy at each of the other of said frequencies;

maintaining one of said locations fixed and varying the spacing between said transmitting and receiving locations; and analyzing the received acoustic energy to compare the resulting amplitude ratio of said different frequencies for variations from the amplitude ratio of said different frequencies when transmitted.

3. A method of geophysical exploration, comprising the steps of producing vibrations of at least first and second frequencies, the amplitudes of which have a fixed ratio to one another;

coupling said vibrations into a geophysical formation at a first location;

receiving said first and second frequency vibrations at a second location, remote from said first location, after passage of said vibrations through said formation; and comparing the amplitudes of said received first and second vibrations to produce an indication of the amplitude ratio of said received vibrations;

and comparing the amplitude ratio of said received vibrations with the fixed amplitude ratio of the produced vibrations providing information about formation conditions.

4. A method, as described in claim 3, wherein the spacing between said first location where vibrations are introduced into the formation and said second location where vibrations are received is kept constant and the first location and second location are moved.

5. A method of geophysical exploration through a fluid filled casing disposed in a borehole, comprising the steps of producing short duration mechanical vibrations of two or more frequencies having a constant amplitude ratio;

coupling the mechanical vibrations of said two or more frequencies to a geophysical formation through the fluid in the casing;

receiving the mechanical vibrations of the two or more produced frequencies passing through the formation back through the fluid in the casing in the borehole, the receiving being timed to respond during a period only after passage of the mechanical vibrations along the casing and before passage of the mechanical vibrations along the fluid in the casing;

converting the received mechanical vibrations into an electrical signal having the same frequency components and relative amplitude as the received vibrations;

filtering said electrical signal to separate the two or more frequencies; and comparing the amplitudes of at least two of the received frequencies to provide an indication of the amplitude ratio of said at least two frequencies;

and comparing the amplitude ratio of said received vibrations with said constant amplitude ratio of said produced vibrations to provide an indication of formation conditions.

6. A method of geophysical exploration, comprising the steps of producing mechanical vibrations of a first and second frequency having a fixed amplitude ratio therebetween;

coupling said first and second frequency vibrations into a formation at a first location;

measuring at a second location remote from said first location the amplitudes of said first and second frequencies after passage through said formation at a selected time interval following the production of said mechanical vibrations;

comparing the amplitudes of the measured first and second frequencies to provide an indication of the amplitude ratio of the frequencies;

comparing the fixed amplitude ratio of the produced vibrations with the amplitude ratio of the measured vibrations to provide an indication of formation conditions; and moving said first and second locations relative to said formation while maintaining said locations a fixed distance apart.

References Cited by the Examiner

UNITED STATES PATENTS

| | | | |
|---|---|---|---|
| 2,233,992 | 3/1941 | Wyckoff | 340—18 |
| 2,732,906 | 1/1956 | Mayne | 181—.5 |
| 3,066,754 | 12/1962 | Johnson | 181—.5 |
| 3,102,251 | 8/1963 | Blizard | 340—18 |
| 3,180,445 | 4/1965 | Schwartz et al. | 181—.5 |
| 3,198,281 | 8/1965 | Mifsud | 181—.5 |
| 3,221,297 | 11/1965 | Smith et al. | 181—5 X |

FOREIGN PATENTS

| | | |
|---|---|---|
| 523,814 | 4/1956 | Canada. |
| 148,919 | 2/1961 | Russia. |

BENJAMIN A. BORCHELT, *Primary Examiner.*

R. M. SKOLNIK, *Assistant Examiner.*